(12) United States Patent
Flores

(10) Patent No.: US 10,800,899 B2
(45) Date of Patent: Oct. 13, 2020

(54) REVERSIBLE OPTICAL ASSEMBLY OF COMPOSITES

(71) Applicant: Yunuen Montelongo Flores, Leon Guanajuato (MX)

(72) Inventor: Yunuen Montelongo Flores, Leon Guanajuato (MX)

(73) Assignee: Yunuen Montelongo, Oxford (GB)

( * ) Notice: Subject to any disclaimer, the term of this patent is extended or adjusted under 35 U.S.C. 154(b) by 507 days.

(21) Appl. No.: 15/190,170

(22) Filed: Jun. 22, 2016

(65) Prior Publication Data
US 2017/0374730 A1    Dec. 28, 2017

(51) Int. Cl.
*C08K 3/08*    (2006.01)

(52) U.S. Cl.
CPC ........ *C08K 3/08* (2013.01); *C08K 2003/0806* (2013.01); *C08K 2201/011* (2013.01)

(58) Field of Classification Search
USPC ........................................................ 250/251
See application file for complete search history.

(56) References Cited

U.S. PATENT DOCUMENTS

| | | | | |
|---|---|---|---|---|
| 6,958,816 B1* | 10/2005 | Dogariu | ................. | G01N 11/02 356/479 |
| 9,181,629 B2* | 11/2015 | Browning et al. | ..... | C25D 11/02 |
| 2008/0047328 A1* | 2/2008 | Wang | ..................... | G01N 11/10 73/54.39 |
| 2010/0221521 A1* | 9/2010 | Wagner | ............... | B01F 17/0028 428/315.5 |
| 2011/0023973 A1* | 2/2011 | Segev | ................. | B01L 3/50273 137/13 |
| 2011/0101211 A1* | 5/2011 | Neel | ...................... | G02B 21/32 250/251 |

* cited by examiner

*Primary Examiner* — Kiet T Nguyen

(57) ABSTRACT

A method to reversibly assembly micro and nanostructures with a force provided by light inside a host medium which behaves as solid during steady state and as a fluid during assembly state. The host medium is a material capable to change from solid to fluid state during assembly and from fluid to solid state during fixation. The change in state at the host medium is controlled with the temperature and/or shear strain.

12 Claims, 2 Drawing Sheets

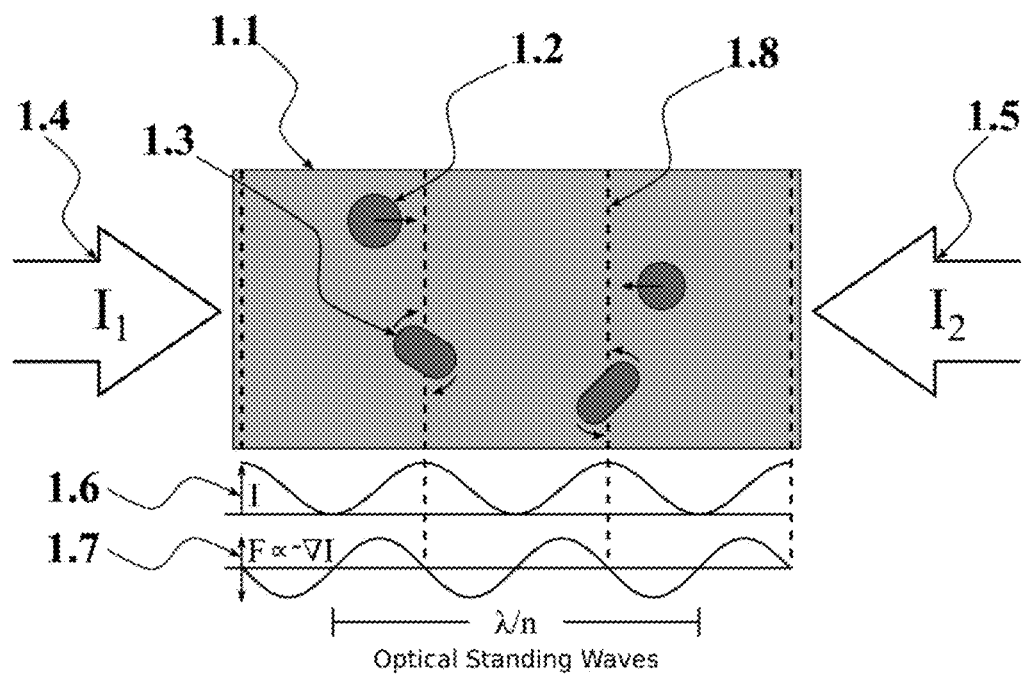
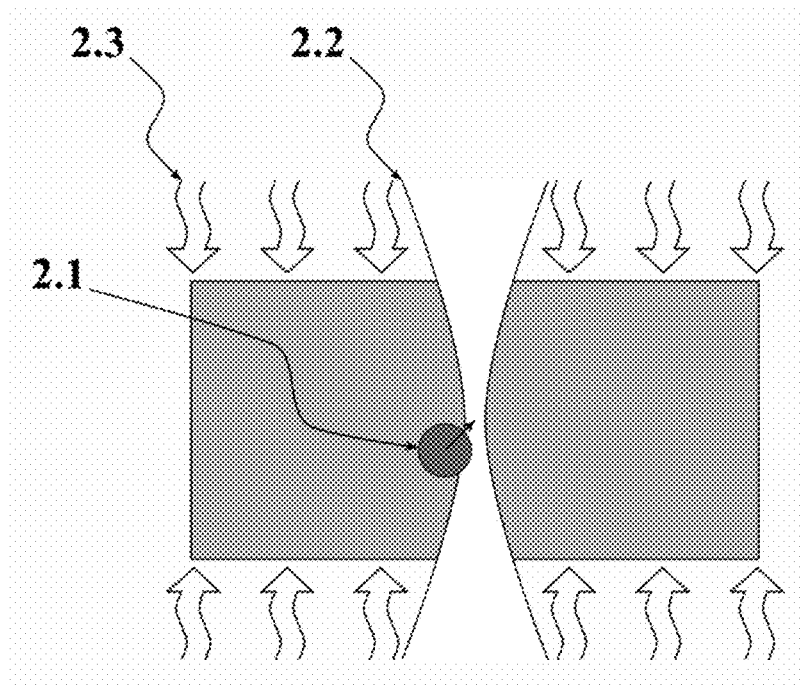
Figure 2

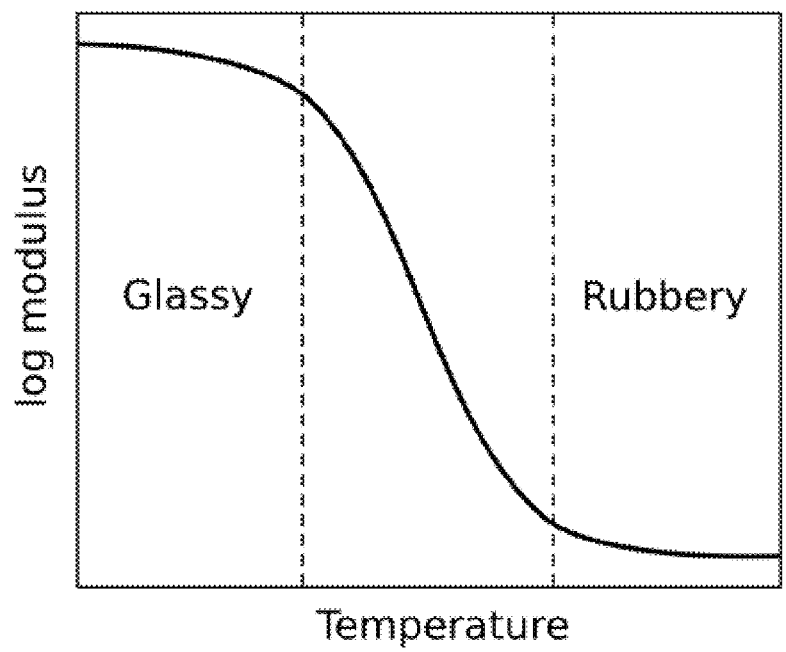
Figure 4
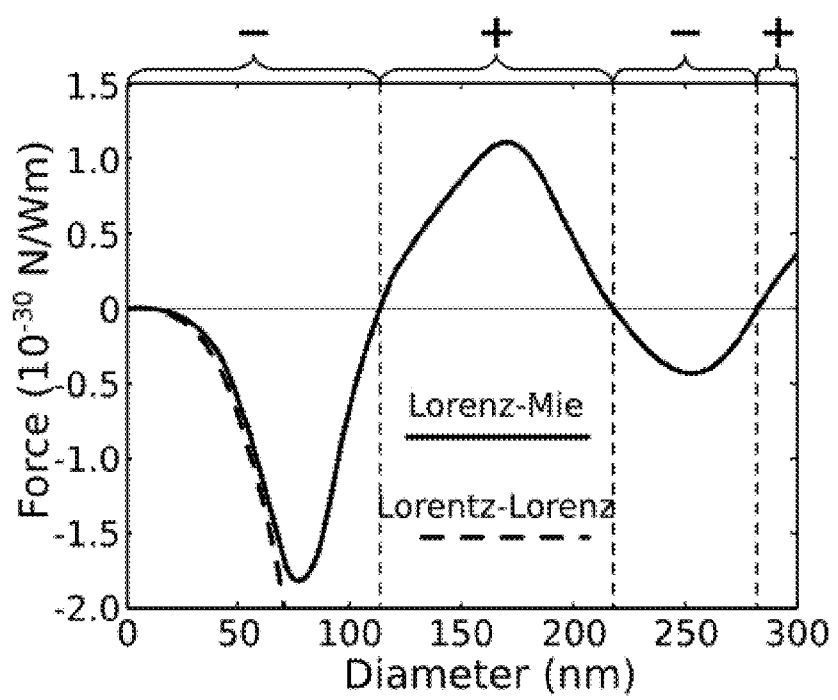

REVERSIBLE OPTICAL ASSEMBLY OF COMPOSITES

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention refers to the article published on the journal Nature Communications (DOI: 10.1038/ncomms12002).

This invention relates to programmable materials that change their physical properties dynamically at the micro and/or nanoscale. This document presents a new type of programmable material which can be configured through light beams. This occurs when dispersed solid micro or nanostructures migrate (or rotate) inside a host material with the action of light. Mechanisms to configure nanostructures in three-dimensional (3D) space are essential in nanotechnology, photonics, and materials science. Various nanopatterning techniques based on photoactive materials or photoablation have been used to produce static photonic crystals, lasers, metamaterials, holograms, storage devices and sensors. Common optical nanofabrication methods rely on light-sensitive materials such as silver halides and photoresists. Additionally, highly intense laser pulses have been applied to ablate materials with spatial selectivity. However, these nanofabrication techniques produce only static structures. This invention relates to a strategy, based on non-ablative laser beam, to arrange structures in three-dimensional (3D) space inside transparent or semitransparent materials with the appropriate mechanical characteristics. At least two materials are necessary to form the programmable composite. One solid material corresponding to non-aggregated suspended micro or nanostructures, and a second material working as a host medium which can behave as solid, semi-solid or fluid depending on the temperature and shear strain applied. Structures, such as nanoparticles embedded in a medium, can be displaced or rotated thanks to the momentum provided by light. The phenomenon in which particles move with light beams inside fluids has been described in literature as photopheresis. Primarily, the photon momentum produces forces because of the scattering and absorption of the nanoparticles. However, thermal forces also occur due to gradients of temperature in the medium. In thermophoresis (or thermodiffusion), the entropy of nanoparticles results in migration and/or rotation from high to low intensity regions. Photophoresis, is the primary phenomenon utilized to displace (and rotate) micro or nanoparticles in this invention (DOI: 10.1016/S0017-9310(00)00230-1).

An ideal host medium is a material which can change from a fluid state to a solid state and vice versa rapidly and locally with a change in temperate or shear strain. Hence, at fluid phase structures are arranged and at solid state fixated. Some materials have a well-defined transition of phase (melting point and freezing point), other solid materials have a more complex rheological characteristics and their viscosity is affected by temperature and shear strain. For example, some material with shear-thinning rheology can decrease their stiffness when a force is applied to the embedded structures. Therefore, a change in temperature and shear strain at the host medium can provide both functionalities: displacement (or rotation) and fixation of nanoparticles according to the temperature and shear strain applied. In the present invention, the embedded elements are arranged with a force provided by light, while the temperature and shear strain is provided by any source (including the light beam itself).

The next section describes patents that are related to the invention. Every patent is described with three characteristics: number, title and a summary.

U.S. Pat. No. 9,063,434 Title: Sub-diffraction-limited patterning and imaging via multi-step photoswitching.
Summary: A photoresist can be configured for spectrally selective reversible transitions between at least two transition states based on a first wavelength band of illumination and a second wavelength band of illumination.

U.S. Pat. No. 8,883,719. Title: Bacteriorhodopsin protein variants and methods of use for long term data storage.
Summary: Bacteriorhodopsin variants for performance in holographic and three-dimensional (3D) memory storage devices are described.

U.S. Pat. No. 8,605,175 Title: Solid-state image capturing device including a photochromic film having a variable light transmittance, and electronic device including the solid-state image capturing device.
Summary: A solid-state image capturing device includes: a semiconductor substrate having a photosensitive surface with a matrix of pixels as respective photoelectric converters.

U.S. Pat. No. 8,529,997. Title: Methods for preparing structured organic film micro-features by inkjet printing.
Summary: The invention discloses a method for making a substrate comprising structured organic film.

U.S. Pat. No. 8,462,603. Title: Device for recording and reading data on a multi-layer optical disc.
Summary: A device for recording/reading information on a multilayer optical disc, comprising an optical disc positioning system.

U.S. Pat. No. 9,242,248. Title: Methods and devices for optical sorting of microspheres based on their resonant optical properties.
Summary: Microspheres brought within vicinity of the surface are subjected to forces that result from a coupling of the evanescent field to whispering gallery modes (WGM) in the microspheres. Microspheres are sorted by this resonant light pressure effects.

U.S. Pat. No. 8,999,731. Title: Programmable illumination pattern for transporting microparticles.
Summary: The invention combines a method and an apparatus that facilitate the spatial manipulation of colloidal particles and molecules at an interface between a light sensitive electrode and an electrolyte solution.

U.S. Pat. No. 8,816,234. Title: Acousto-optic sorting.
Summary: A method for sorting particles in a fluid. The method involves generating an optical landscape using an acousto-optic device. Preferably, the optical landscape is arranged to sort particles based on size or refractive index or shape.

U.S. Pat. No. 8,767,216. Title: Holographically illuminated imaging devices.
Summary: An imaging system which consist of: a holographic element that transforms an illumination beam into a focal array of light spots, a scanning mechanism that moves an object across the focal array of light spots, and a light detector that generates data from the received light.

U.S. Pat. No. 8,964,518. Title: Data recording apparatus and method using 3D optical memory, and authentication apparatus and method using 3D optical memory.
Summary: A data recording apparatus and method using three dimensional (3D) optical memory and an authentication. The data recording apparatus includes a recording excitation light splitting unit, a condition storage unit, and a data recording unit.

U.S. Pat. No. 8,634,119. Title: System for holography.
Summary: The present invention provides systems of recording holograms that reduce the writing time, increase the diffraction efficiency, improve the resolution, or restitute color.

U.S. Pat. No. 8,203,780. Title: Systems and methods for improving the performance of a photorefractive device.
Summary: The device comprises a layered structure in which one or more polymer layers are interposed between a photorefractive material and at least one transparent electrode layer.

U.S. Pat. No. 5,800,950. Title: Recording medium
Summary: This invention relates to a recording element for a photorefractive polymer, having a recording layer in which an inner electric field is adapted.

U.S. Pat. No. 5,289,407. Title: Method for three dimensional optical data storage and retrieval.
Summary: A method which alter locally the refractive index of a photopolymer induced by two-photon excitation of a photosensitizer.

U.S. Pat. No. 6,958,816. Title: Microrheology methods and systems using low-coherence dynamic light scattering.
Summary: The patent describes a method to measure the rheologic characteristics of complex fluid through the dynamic light scattering and fiber optics.

Patent No. 2010/0221521. Title: Shear thickening fluid containment in polymer composites.
Summary: The invention describes a shear thickening fluid combined with particles that exhibits unique rheological responses such as phase inversion and hysteretic behaviors.

BRIEF SUMMARY OF THE INVENTION

The purpose of this invention is to provide a new mechanism to arrange solid structures (in the 3D space) inside an embedding medium which behave as fluid during writing state and as solid during fixation state. To achieve this, it is necessary a composite of dispersed micro or nanostructures suspended in a host transparent or semi-transparent medium. The energy to displace (or rotate) the embedded structures is provided by light. Although the displacement and rotation of particles by the action of light is well established, this invention introduces the concept of arranging micro or nanostructures inside solid or semi-sold materials. In contrast to liquid crystals and photrefractive (or photochromic) materials, the manipulation of the structures does not occur at the molecular level nor it includes a change in the molecular structure. In the present invention, the chemical configuration of both, the embedded structures and the host medium should be maintained to allow reversibility. The transformation of the composite occurs at physical level without affecting the covalent or ionic bonding.

In the present invention, the energy to displace (or rotate) the micro or nanostructures is provided by light—photophoresis—. When an incidental light beam interacts with the structures, different forces arise: optical and/or thermal. The optical force (or radiation pressure, also known as "optical tweezers") can be formed at the gradients of the electromagnetic field, or in the direction of the propagation of the ray. For example, two interfering coherent light sources can produce strong intensity gradients in the three-dimensional space. These fringe patterns can be controlled with the propagated wavefront of the interfering beams. Complex arrangements can be assembled with the gradients produced by interfering rays.

A thermal force appears with light absorption. In this case, a gradient of temperatures can produce a force in the embedded element from the high temperature point to the low temperature point (thermophoresis). Another consequence of this effect is the temporal expansion of the materials, which can induce an acoustic force.

Similarly, the rotation of the nanostructure can be observed by a torque produced by optical pressure or thermal force. Furthermore, a light beam with angular momentum (or with light momentum induced by the structure) can produce a torque on the nanoparticle. In practice, these phenomena occur simultaneously when a beam of light interacts with the composite. Although these phenomena are well established, the energy provided by light to configure the composite is just an element of this invention.

The mechanism involved is a technique to structure composites at the micro and nanoscale in 3D patterns. In this context, a composite is a mixture of two or more materials which do not produce a chemical bonding. These materials can be separated and displaced physically. At least one of the components should be capable to reversibly transform from a solid state to a fluid state. This component is referred as host medium and it provides the required plasticity. Similarly, it is necessary a second material, which is structured at the micro or nanoscale. This second material is commonly composed of nanoparticles that can be displeased or rotated inside the host medium. In broad terms, a preferred embodiment of the composite is comprised of at least one nanostructured material and one host medium with the suitable viscoelastic characteristics.

The host medium should have the capability to be fluid during writing time, but rigid enough to maintain the structures fixated in stable positions after the writing stage. The transition between these two states is controlled through two types of physical mechanisms: temperature and force. Most materials trend to reduce their viscosity at high temperatures. Some of them have a specific melting point where they behave as fluids. However, most solid materials have a more complex rheological behavior and their viscoelasticity is a function of temperature and shear strain. The temperature is provided to the composite in an extrinsic or intrinsic manner. Extrinsic refers to heat transferred from external sources through conduction, convection or radiation. Intrinsic refers to heat transferred from the light source to arrange the structures. In the intrinsic case the light source heats the medium, the particles or both. For instance, when a pulsed light source heats the nanoparticles embedded in the solid host medium, the heat remains localized for a period of time before it dissipates. Hence, intrinsically heated media can be controlled more efficiently with pulsed light beams as the temperature heat is confined before diffusion takes place. An important advantage of intrinsically heated configurations is that different elements can be displaced or rotated independently without affecting the rest of the assembly.

An embedding medium with shear-thinning characteristics is ideal because it reduces its viscosity with both: temperature and shear strain. For instance, the shape-memory characteristics of some types of materials (including glass, gelatin or polymers) can be applied as a host medium. The displacement of a nanostructure embedded in a shear-thinning solid is facilitated when the force provided by light is applied. In this scenario, the light should be preferably pulsed, so the energy is released with large force in a short period of time.

One advantage of this invention in contrast with other technologies such as photorefractive or photochromic materials, is that these types of composites can maintain the configuration without the aid of external energy. Consequently, the configuration is maintained indefinitely until a new writing process starts again. Another advantage of the invention is that large arrays of particles can be assembled simultaneously and/or locally according to the requirements of the process.

In broad terms, a preferred embodiment of the mechanism of assembly is comprised of the following steps: an initial state where structures are randomly distributed, a transition state where structures migrate to lower-energy configurations through the momentum provided by light, and a final assembly state where structures are located in new stable positions. An optional intermediate state of heating the composite might be necessary to facilitate the process.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the inventive concept. Thus, the following drawings and description are to be regarded as illustrative in nature and not restrictive.

BRIEF DESCRIPTION OF THE DRAWING

In the drawings, the depicted elements are not necessarily to scale, emphasis instead generally being placed upon illustrating the principles of the invention. In the following description, various embodiments of the present invention are described with reference to the following drawings, in which:

FIG. 1. Schematically depicts the light-induced mechanism where micro/nanoparticle displace and rotate in an intensity standing wave. It can be observed that the force is proportional to the gradient of the intensity, and that the potential wells where the micro/nanoparticle relocate are created at the antinodes of the intensity standing wave.

FIG. 2. Schematically depicts the light-induced mechanism of a single micro/nanoparticle displace towards the focus of a laser beam. Herein an additional heat transfer mechanism of radiation conduction and/or convection is applied to facilitate the change in temperature.

FIG. 3. Schematically depicts the rheology characteristics of a typical thermoplastic (e.g. the complex shear modulus (G'+i G") of pHEMA changes from $1.4 \times 10^9 + i\ 2.0 \times 10^7$ Pa in the glassy regime to $2.9 \times 10^4 + i\ 2.0 \times 10^4$ Pa well above its glass transition temperature (Tg) of 300° C.).

FIG. 4. Schematically depicts the relative maximum force acting on Ag nanoparticles of different diameters with a standing wave of 532 nm.

DETAILED DESCRIPTION OF THE INVENTION

The invention refers in broad terms to assemblies of micro or nanostructures in solid or semi-solid media with the action of light. The invention refers in broad terms to assemblies of micro or nanostructures in solid or semi-solid media with the action of light. FIG. 1 shows a diagram of this "light-induced mechanism" with the three basic features of the embodiment of this invention. The first basic feature of the embodiment is a homogeneous material, defined herein as the "host medium" (1.1), which can be in a "solid form" or in a "fluid form". Solid materials become fluid at high temperature, the precise behaviour of the stiffness is dictated by the rheology of the material (this is the temperature and shear strain applied). The second feature are the embedded "microparticles" or "nanoparticles" (1.2 and 1.3), and the third feature is the interference of "laser light beams" (1.4 and 1.5). The interference of multiple light beams creates an "intensity standing wave" (1.6) which in turns produces a "light-induced force" or "photophoresis" (1.7) commonly referred in literature as the "optical tweezing effect". The optical tweezing effect is created by the difference in refractive indices between the micro/nanoparticles and the host medium. This light-induced force creates potential wells at the "antinodes" (1.8) where the micro/nanoparticles are displaced (such as in 1.2) or rotated (such as in 1.3) during the process. When the micro/nanoparticles have higher refractive indices than the host medium, the induced force occurs towards the maximum intensity regions, in contrast, when the micro/nanoparticles have lower refractive indices than the host medium, the induced force occurs towards the minimum intensity regions. In the case of metallic nanoparticles, the force is related to phase of the plasmonic resonance of the electromagnetic field.

Initially the micro/nanoparticles are maintained in self-standing position, this is referred as the "fixated state" where the host material is in the "solid form". The light-induced mechanism to arrange the embedded micro/nanoparticles inside the host medium consist in three steps. In the first step, the host material reduces the adhesion that fixates the structures, either with the temperature or the force applied to the embedded micro/nanoparticles, this is the "assembling state" of the host material, where it is in the "fluid form". In the second step, the micro/nanoparticles displace (or rotate) to the potential wells produced by the standing waves. And in the third step, the host material recovers the fixated state where the micro/nanoparticles are maintained in self-standing position, but with new locations and orientations.

A possible situation is the arrangement of single micro/nanoparticles with the action of a focused laser beam. FIG. 2 shows a diagram where a "single micro/nanoparticle" (2.1) is displaced towards a "focused laser light beam" (2.2). In this scenario the optical tweezer effect is not produce with standing waves, and there is not a collective effect over multiple micro/nanoparticles. Furthermore, an optional feature of "heat transfer mechanism" (2.3) is proposed in the invention. This heat transfer mechanism consists of the induction of radiation, conduction and/or convection that facilitates the change in temperature in the host medium.

For example, nanoparticles can be fixated by frozen water and displaced within liquid phase. In this case, if nanoparticles absorb light, they can increase locally the temperature to produce a transition of phase. Furthermore, when heat is transferred with a light pulse, it is possible to adjust the transition of phase just at the boundary of nanoparticles while they are displaced or rotated. A similar effect can be induced in gelatin, but with the additional effect of reduction in viscosity due the shear strain applied at the boundaries of nanoparticles. A composite has demonstrated to work with silver nanoparticles embedded hydrogel. An expanded example is described in the following section; however, the invention is not limited to the embodiment.

Working Example

An assembly of nanoparticles embedded in a solid is reconfigurable with radiation pressure when the viscoelasticity of the medium permits the migration and the stabilization in a reversible manner. When the force crosses a threshold, nanoparticles overcome surface adhesion, elastic forces, and the static friction induced by the medium. This phenomenon is analogous to "the knife in the butter", where the medium changes its stiffness according to the temperature of the metal. This working example is described in two sections: overview, and experimental demonstration.

Overview

Ag nanoparticles are arranged dynamically in a three-dimensional (3D) space within a poly(2-hydroxyethyl methacrylate) (pHEMA) as the embedding medium. Ag nanoparticles were considered due their high optical scattering and absorption. PHEMA was chosen as a host medium due its unique rheological characteristics. PHEMA matrix can reversibly transform from its glass state to its rubber state by increasing the temperature at the nanoparticle boundaries. The glass and the rubber behaviors correspond to the fixated and fluid states respectively. When the pHEMA matrix increases in temperature the viscoelasticity reduces allowing the migration of the nanoparticles. Notice that the phase transition temperature of Ag nanoparticles is lower than bulk Ag but still higher than the degradation temperature of pHEMA, both of which are slightly above 300° C. (S. A. Little, et al. Appl. Phys. Lett., vol. 100, no. 5, p. 51107, January 2012; M. Coşkun, et al. Polym. Degrad. Stab., vol. 61, no. 3, pp. 493-497, 1998). The temperature at the boundary of the nanoparticles dictates the mechanical properties of the surrounding medium. Since pHEMA has low heat conduction, the high temperature at the nanoparticle-pHEMA boundary allows the pHEMA matrix to behave like viscoelastic rubber. Furthermore, this effect is present as long as the heat of the metal diffuses in the pHEMA matrix. A pHEMA matrix that transforms from its glass state to its rubber state by increasing the temperature at the nanoparticle boundaries was rationally designed. FIG. 3 shows the change in viscosity in the host medium with different temperatures.

When nanoparticle boundaries temperature is increased, nanoparticles move their position. Depending on the size, nanoparticles settle at the maximum intensity or minimum intensity regions of the interference fringe (P. Zemánek, et al. J. Opt. Soc. Am. A, vol. 19, no. 5, pp. 1025-1034, May 2002). We use optical standing waves to control heat and optical force to arrange nanoparticles in different 3D configurations. Dielectric and metal nanoparticles in viscoelastic media have a complex behavior in the presence of radiation gradients. An optical force (tractor force) results from the momentum transfer associated with the spatially asymmetric light scattering and absorption of a nanostructure (O. Brzobohatý, et al. Nat. Photonics, vol. 7, no. 2, pp. 123-127, February 2013). Electromagnetic forces in gradients can push particles toward regions of maximum intensity (positive force) or minimum intensity (negative forces) (M. Siler, et al. J. Quant. Spectrosc. Radiat. Transf., vol. 126, pp. 84-90, September 2013). In dielectrics, the force can be positive or negative when the nanoparticle has higher or lower refractive indexes than the medium, respectively (K. C. Neuman and S. M. Block, Rev. Sci. Instrum., vol. 75, no. 9, pp. 2787-2809, September 2004). The phase shift of the scattering dictates the direction of the force. In metal nanoparticles, the phase and intensity of the scattering depends on the Surface Plasmon Resonance (SPR) produced by the free electron cloud. Hence, the direction of the optical force is dictated by different factors including geometry, size and material of the nanoparticle, the surrounding medium, and the wavelength of the applied field (A. Dogariu, et al. Nat. Photonics, vol. 7, no. 1, pp. 24-27, Jan. 2013; K.-S. Lee and M. A. El-Sayed, J. Phys. Chem. B, vol. 109, no. 43, pp. 20331-20338, November 2005).

Arbitrary standing waves were defined with the interference of two counter-propagating beams. The phase of the standing wave was controlled with the relative phase difference between the beams. Hence, the force exerted by the standing wave of two counter-propagating beams is proportional to the gradient of the intensity of the beam. In this case, the displacement of nanoparticles occurs from bright regions antinodes to dark regions antinodes of the standing wave due the negative force produced from the plasmonic resonance.

In order to calculate the migration, it was applied the generalized Stokes' law for a nanoparticle of radius r embedded in a complex viscoelastic medium with a shear modulus $G=2.9\times10^4+i2.0\times10^4$. FIG. 4 shows the relative maximum force of Ag nanoparticles using a standing wave from a 532 nm light source.

Experimental Demonstration

In order to demonstrate a 3D nanoassembly, a Nd:YAG (532 nm, 5 ns) pulsed laser was used to form a standing wave. The nanoparticle displacement was increased by repeating the number of pulses. Ag nanoparticles were arranged in a slanted 3D structure with a periodicity of ~λ/2. We recorded multilayer structures by titling the sample at different angles with respect to the standing wave. The fabricated nanostructure served as a narrow-band wavelength-selective filter to diffract an intense color at 8° away from the sample normal.

To demonstrate reversibility, we recorded a grating at 5° from the surface plane and erased it (recorded at 0°) iteratively several times. The holographic patterning technique can be used to configure different crystal plane orientations. Bragg planes were superposed at 5°, 10°, 15°, 20°, and 25° to form photonic crystals. To erase the pattern, pHEMA matrix was aligned parallel to the surface plane of the object (i.e. front-surface mirror) at 0°. This configuration aligned the multilayer structure with the specular reflection (zero order). Crystal structures in binary configurations were also recorded and erased to demonstrate volumetric data storage. The composite was also utilized to fabricate dynamic lenses and holographic reconstruction of coins and other objects.

Although some embodiments are shown to include certain features, the applicant(s) specifically contemplate that any feature disclosed herein may be used together or in combination with any other feature on any embodiment of the invention. It is also contemplated that any feature may be specifically excluded from any embodiment of an invention.

What is claimed is:

1. A light-induced mechanism to arrange micro/nanoparticles embedded in a host medium, fixated with arbitrary locations and orientations, through a process comprising the steps of:
    transforming properties of the host medium, from the solid form to the fluid form, by increasing the temperature of the host medium due to the energy absorption of laser light beams;
    displacing and rotating the micro/nanoparticles inside the host medium in the fluid form due to the laser light beams inducing photophoresis, which is an optical tweezing effect; and
    recovering of the solid form of the host medium for fixating the micro/nanoparticles in new locations and orientations due to reducing the temperature of the host medium.

2. The mechanism of claim 1, wherein the host medium has a well-defined melting temperature where it transforms to the fluid form, and freezing temperature where it transforms to the solid form.

3. The mechanism of claim 1, wherein the increment and reduction of temperatures are facilitated by a heat transfer mechanism including radiation, conduction and/or convection.

4. The mechanism of claim 1, wherein the micro/nanoparticles have arbitrary sizes, shapes and materials.

5. The mechanism of claim 1, wherein the micro/nanoparticles are displaced by the laser light beams between different stable positions.

6. The mechanism of claim 1, wherein the micro/nanoparticles are rotated by the laser light beams between different stable positions.

7. The mechanism of claim 1, wherein the micro/nanoparticles are arranged by the laser light beams with optical pressure or optical tweezers.

8. The mechanism of claim 1, wherein the micro/nanoparticles are arranged by thermophoresis using the laser light beams.

9. The mechanism of claim 1, wherein the host medium is transformed from the solid form to the fluid form by increasing the temperature of the host medium using the laser light beams.

10. The mechanism of claim 1, wherein the host medium is a non-Newtonian shear thinning material which reduces its stiffness and becomes more fluid when the forces of the laser light beams are applied to move the micro/nanoparticles.

11. The mechanism of claim 1, wherein the micro/nanoparticles are assembled collectively with a spread laser light beam.

12. The mechanism of claim 1, wherein the micro/nanoparticles are assembled locally with a focused laser light beam.

* * * * *